United States Patent [19]

Fanta

[11] 4,073,731

[45] Feb. 14, 1978

[54] PUSH-TYPE CENTRIFUGE

[75] Inventor: Peter Fanta, Schlieren, Switzerland

[73] Assignee: Escher Wyss Limited, Zurich, Switzerland

[21] Appl. No.: 732,053

[22] Filed: Oct. 13, 1976

[30] Foreign Application Priority Data

Oct. 21, 1975 Switzerland ....................... 13602/75

[51] Int. Cl.[2] ....................... B01D 33/10; B01D 35/16

[52] U.S. Cl. .................................. 210/376; 233/1 R; 308/174; 308/232

[58] Field of Search .................. 210/376; 233/1 A, 5, 233/1 R, 23 A, 23 R; 418/203; 308/232, 233, 174, 234, 176; 64/1 R, 23, 23.5, 23.6

[56] References Cited

U.S. PATENT DOCUMENTS

| | | | |
|---|---|---|---|
| 2,232,769 | 2/1941 | Buddeberg | 210/376 |
| 2,755,934 | 7/1956 | Ruegg | 210/376 |
| 2,820,436 | 1/1958 | Ruegg | 210/376 |
| 2,899,065 | 8/1959 | Irving | 210/376 |
| 3,161,349 | 12/1964 | Schibbye | 418/203 |
| 3,932,073 | 1/1976 | Schibbye et al. | 418/203 |

FOREIGN PATENT DOCUMENTS

| | | | |
|---|---|---|---|
| 842,305 | 6/1939 | France | 210/376 |
| 1,191,302 | 4/1965 | Germany | 210/376 |
| 939,739 | 3/1956 | Germany. | |
| 220,555 | 7/1942 | Switzerland | 210/376 |
| 496,808 | 12/1938 | United Kingdom | 210/376 |

*Primary Examiner*—Frank Sever

*Attorney, Agent, or Firm*—Robert A. Ostmann

[57] ABSTRACT

Push-type centrifuge, with a rotor which comprises a centrifuging drum and a push plate and a push motor comprising a push piston and a push cylinder, which motor is arranged coaxially of the rotor, while the push cylinder is connected fast to the stationary centrifuge housing, and the push piston rotates with the rotor, characterized in that the shaft of the rotor and the push cylinder of the push motor are mounted one within the other by a double-acting axial bearing.

3 Claims, 2 Drawing Figures

Fig.1
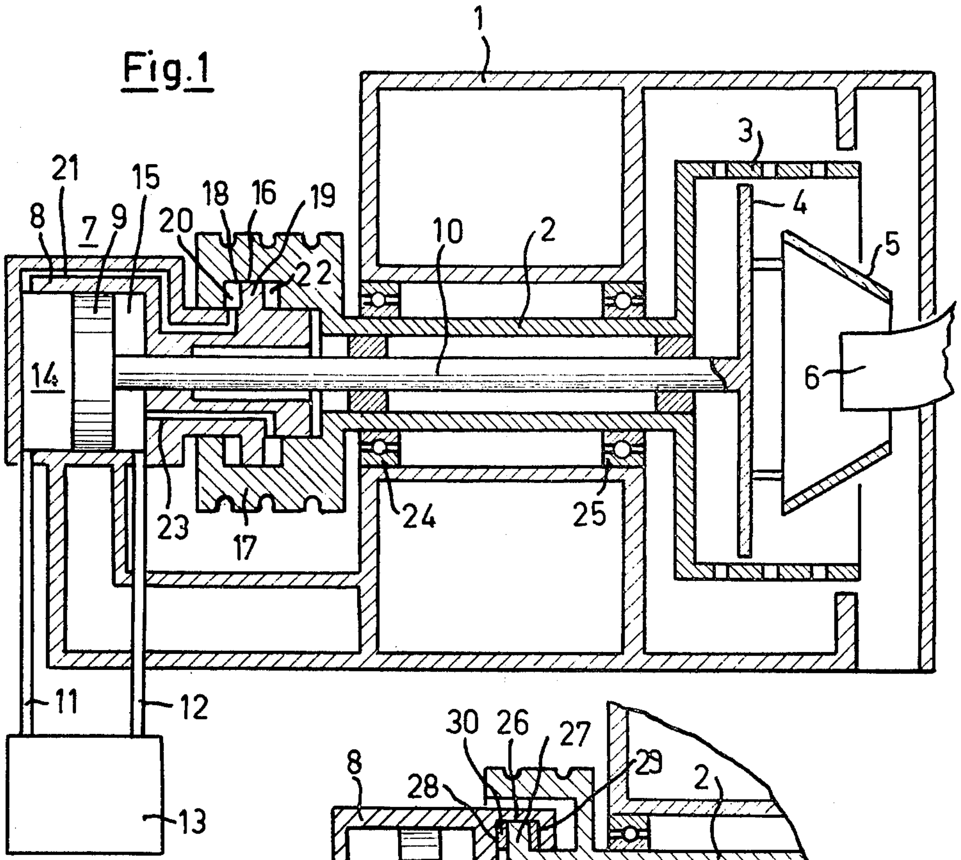
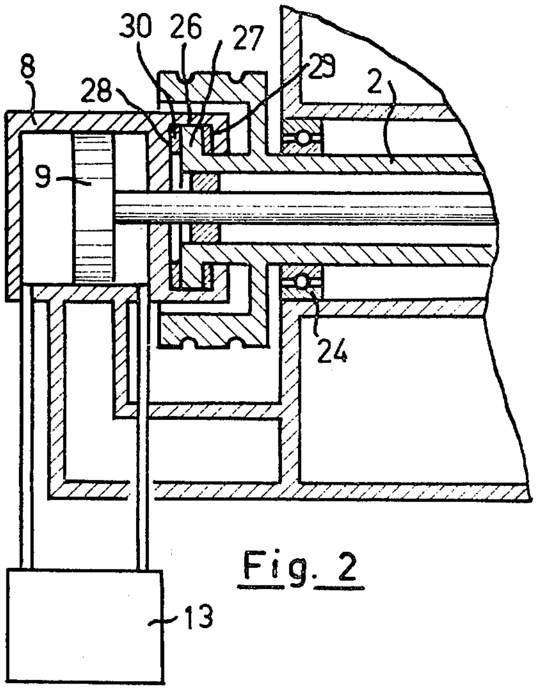
Fig. 2

PUSH-TYPE CENTRIFUGE

BACKGROUND OF THE INVENTION

The invention relates to a push-type centrifuge which has a rotor comprising a centrifuging drum and a push plate and a push motor comprising a push piston and a push cylinder, the said motor being arranged coaxially of the rotor, while the push cylinder is connected fast to the stationary centrifuge housing and the push piston rotates with the rotor.

One such pusher centrifuge is known from German Patent Specification 939,739. The stationary push cylinder has the advantage that the pressure medium for the push motor no longer has to be introduced via stationary sliding rings into the rotating rotor, but that it is possible to provide, for the pressure medium, stationary pipes which lead into the stationary push cylinder. In addition, the major part of the pressure medium introduced at any time into the push cylinder remains non-rotating, so that only a small part of the pressure medium introduced into the said cylinder has to be set in rotation.

However, the known push-type centrifuge has the disadvantage that the push forces have to be taken up by the centrifuge housing. If the said forces are strong, then bending occurs with the conventional forms of housings, and this bending endangers the mounting of the rotor in the housing and the mounting of the push piston in the push cylinder.

SUMMARY OF THE INVENTION

The invention has for its object to relieve the centrifuge housing of the bending forces.

In connection with a push-type centrifuge of the kind initially described, this object is achieved according to the invention by the shaft of the rotor and the push cylinder of the push motor being mounted one within the other by a double-acting axial bearing.

It is also advantageous for the axial bearing to comprise a double-acting relief cylinder and a relief piston which is arranged in the latter, one end of the relief cylinder being connected to one end of the push cylinder, while the other end of the relief cylinder is connected to the other end of the push cylinder, in each case by a pipe and in such a way that the shaft of the rotor and the push piston of the push motor are forced in opposite directions by the pressure medium of the push motor disposed at the time in one of the pipes.

More especially, if those ends of the relief cylinder and push cylinder which are respectively interconnected by one of the pipes have cross-sectional surfaces of equal size, the axial forces of the push mechanism are balanced.

The bearings between rotor and centrifuge housing hold these two parts in their relative position. The relief cylinder and relief piston do of course rotate relatively to one another, but the relief piston floats axially and practically without any friction on the pressure medium which is in the relief cylinder.

BRIEF DESCRIPTION OF THE DRAWING

Constructional examples of the invention are shown in simplified form in the drawing, by reference to which the invention is more fully explained.

FIG. 1 shows a vertical axial section through a push-type centrifuge, and FIG. 2 shows a detail of a vertical axial section through another such centrifuge.

DESCRIPTION OF THE PREFERRED EMBODIMENTS

The push-type centrifuge shown in FIG. 1 comprises a stationary centrifuge housing 1, a centrifuging drum 3 which is carried by a shaft 2 mounted in the said housing 1 and a push plate 4 which is arranged in the centrifuge drum 3 and can be moved backwards and forwards axially in relation to the centrifuge drum. An entry hopper fixed on the push plate 4 is indicated at 5, while a supply pipe for the mixture of liquids and solids to be centrifuged is indicated at 6.

A push motor 7 arranged coaxially of the centrifuge axis comprises a double-acting push cylinder 8 and a push piston 9, which is connected by a shaft 10 to the push plate 4. The said cylinder 8 is connected fast to the stationary centrifuge housing 1 and the push piston 9 rotates with the rotor 2, 3, 4.

The stationary push cylinder 8 is connected by means of pipes 11 and 12 which convey pressure medium and which are stationary, to a controlled source 13 of the said medium. The pressure medium source 13 is so controlled by known means that oil under pressure flows into the push cylinder 8 via the pressure medium pipe 11, and pressure medium flows out of the push cylinder 8 via the pressure medium pipe 12 until the push piston 9 and the push plate 4 reach their end position on the right in the drawing. The pressure medium source 13 is thereupon reversed by the known means, so that pressure medium flows into the push cylinder 8 through the pressure medium pipe 12 and pressure medium flows out of the push cylinder 8 through the pressure medium pipe 11 until the end position of the push piston 9 and of the push plate 4 on the left of the drawing are reached.

The push piston 9 rotating relatively to the push cylinder 8 can be sealed off from said cylinder 8 by a non-contacting labyrinth packing. It is also possible with advantage to provide a threaded groove packing.

Since the major portion of the walls limiting the pressure medium spaces 14 and 15 of the push cylinder 8 is stationary, it is only the minor portion of the pressure medium actually entering one of the two spaces or chambers 14 and 15 which has to be set in rotation. The passage cross-section of the stationary pressure medium pipes 11 and 12 may readily be kept large.

The shaft 2 of the centrifuging drum 3, and the push cylinder 8 are mounted one within the other by a double-acting axial bearing 16. The axial bearing 16 is arranged inside a belt pulley 17 of the shaft 2.

The axial bearing 16 is formed by a double-acting relief cylinder 18 and a relief piston 19 which is arranged in the latter. One end of the relief cylinder, namely, the space 20, is connected by a conduit 21 to one of the ends of the push cylinder 8, namely, to the space 14. The other end of the relief cylinder, namely, the space 22, is connected via a conduit 23 to the other end of the push cylinder 8, namely, the space 15. As a result thereof, the shaft 2 of the centrifuging drum 3 and the push piston 9 with the shaft 10 and the push plate 4 are respectively forced in opposite directions by the pressure medium of the push motor 7.

Those ends of the relief cylinder 18 and push cylinder 8 which are respectively connected by the conduit 21 and 23, respectively, have cross-sectional surfaces which are of the same size, that is to say, the cross-sectional area of the space 20 is of the same size as the cross-sectiional area of the space 14, and the cross-sectional area of the space 22 has the same size as the cross-sectional area of the space 15. Corresponding to the cross-sectional area of the shaft 10, the internal diameter of the space 22 is somewhat larger than the internal diameter of the space 20. As a consequence, the axial forces of the push mechanism are balanced. The bearings 24 and 25 between the rotor 2, 3, 4 and the centrifuge housing 1 are thereby relieved of axial forces.

Referring to the push mechanism shown in FIG. 2, the double-acting axial bearing, which mounts the shaft 2 of the rotor and the push cylinder 8 of the push motor one within the other, is constructed as a comb bearing 26. A comb 27 fixed on the shaft 2 extends into a groove 28 of the push cylinder 8 and in this position slides positively and immovably axially on two bearing rings 29 and 30 relatively to the push cylinder 8.

I claim:

1. In a push-type centrifuge having a stationary housing; a rotor comprising a shaft, a centrifuging drum and a push plate; and a double-acting fluid pressure operated push motor which is coaxial with the rotor and has a cylinder which is fixed to the housing and contains opposed working spaces, and a piston which is connected and rotates with the push plate and moves the latter forward or backward depending upon which of the working spaces is subjected to the higher pressure, and wherein the cylinder and the shaft are subjected to axial forces which act in opposite directions as the push plate is moved; the improvement which comprises a double-acting axial bearing which is positioned and reacts between the cylinder and the shaft and serves to apply directly to the cylinder and the shaft, respectively, said axial forces acting on the shaft and cylinder, said axial forces counteracting each other directly through the axial bearing so that the load on the housing attributable to those forces is reduced.

2. A push-type centrifuge as defined in claim 1 in which said axial bearing comprises a. a relief cylinder element containing a double-acting piston element which divides the cylinder into opposed pressure chambers, b. one element being connected with the push motor cylinder and the other element being connected with the shaft;

c. a first conduit connecting one pressure chamber with one working space of the push motor; and d. a second conduit connecting the other pressure chamber with the remaining working space of the push motor.

3. A push-type centrifuge as defined in claim 2 in which each pressure chamber has the same cross sectional area as the working space with which it is connected.

* * * * *